(12) United States Patent
Fleps-Dezasse et al.

(10) Patent No.: US 12,024,179 B2
(45) Date of Patent: Jul. 2, 2024

(54) ASCERTAINING AN INPUT VARIABLE OF A VEHICLE ACTUATOR USING A MODEL-BASED PREDICTIVE CONTROL

(71) Applicant: ZF Friedrichshafen AG, Friedrichshafen (DE)

(72) Inventors: Michael Fleps-Dezasse, Markdorf (DE); Michel Wilde, Munich (DE); Nils Mühl, Dresden (DE); Ulrich Mair, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/603,766

(22) PCT Filed: Mar. 11, 2020

(86) PCT No.: PCT/EP2020/056412
§ 371 (c)(1),
(2) Date: Oct. 14, 2021

(87) PCT Pub. No.: WO2020/212020
PCT Pub. Date: Oct. 22, 2020

(65) Prior Publication Data
US 2022/0363271 A1    Nov. 17, 2022

(30) Foreign Application Priority Data

Apr. 15, 2019    (DE) .......................... 102019205405.6

(51) Int. Cl.
*B60W 50/00*    (2006.01)
(52) U.S. Cl.
CPC . *B60W 50/0097* (2013.01); *B60W 2050/0028* (2013.01); *B60W 2530/20* (2013.01); *B60W 2552/40* (2020.02)

(58) Field of Classification Search
CPC ......... B60W 50/0097; B60W 2552/40; B60W 2050/0028
See application file for complete search history.

(56) References Cited

U.S. PATENT DOCUMENTS

2015/0073663 A1*  3/2015  Nilsson ............. B60W 50/0097
                                                         701/41
2017/0253241 A1   9/2017  Filev et al.
(Continued)

FOREIGN PATENT DOCUMENTS

DE    102011085347 A1    5/2013
EP         1777135 B1    1/2010
EP         2848487 A1    3/2015

OTHER PUBLICATIONS

International Search Report and Written Opinion for PCT/EP2020/056619 mailed Jun. 30, 2020 (12 pages; with English translation).

*Primary Examiner* — Amelia Vorce
(74) *Attorney, Agent, or Firm* — Kristin L. Murphy

(57) ABSTRACT

The disclosure relates to a process of ascertaining an input variable of a vehicle actuator using a model-based predictive control. A processor unit accesses trajectory information and a state data set, which represents a state of surroundings of a vehicle, the vehicle, and/or the vehicle, by an interface. The processor unit carries out a secondary condition algorithm in order to calculate a secondary condition and an MPC algorithm for a model-based predictive control. By carrying out the secondary condition algorithm, a secondary condition is ascertained for the MPC algorithm based on the trajectory information and the state data set. By carrying out the MPC algorithm, an input variable is ascertained for an actuator of the vehicle based on the secondary condition. This is carried out such that in a future predicted trajectory, the vehicle follows the specified trajectory with a specified degree of reliability.

14 Claims, 3 Drawing Sheets

(56) References Cited

U.S. PATENT DOCUMENTS

| | | | |
|---|---|---|---|
| 2018/0304900 A1* | 10/2018 | Luo | G01C 21/3407 |
| 2019/0001988 A1 | 1/2019 | Ienaga et al. | |
| 2020/0216085 A1* | 7/2020 | Bobier-Tiu | B60W 40/08 |
| 2020/0290577 A1* | 9/2020 | Berntorp | B60T 8/1725 |
| 2020/0293009 A1* | 9/2020 | Quirynen | G05B 13/041 |
| 2022/0219691 A1* | 7/2022 | Maleki | B60W 30/143 |

\* cited by examiner

ASCERTAINING AN INPUT VARIABLE OF A VEHICLE ACTUATOR USING A MODEL-BASED PREDICTIVE CONTROL

CROSS-REFERENCE TO RELATED APPLICATIONS

This application is a national stage of International Application No. PCT/EP2020/056412, filed Mar. 9, 2020, the disclosure of which is incorporated herein by reference in its entirety, and which claimed priority to German Patent Application No. 102019205405.6, filed Apr. 15, 2019, the disclosure of which is incorporated herein by reference in its entirety.

TECHNICAL FIELD

The disclosure relates to ascertaining an input variable of a vehicle actuator by a model-based predictive control.

BACKGROUND

Within the context of automated driving, stringent demands in terms of tracking accuracy, stability and robustness are made upon a trajectory control system for a vehicle. These properties have to be ensured within the entire working range of the trajectory control system. A significant factor of influence on the control of the trajectory is the tire/roadway contact, since the transmission of power between the vehicle and the road occurs here. Taking the tire/roadway contact into consideration in a trajectory control system can be undertaken by methods of so-called robust control or, when information relating to the tire/roadway contact is available, by so-called gain-scheduling approaches.

It is also known to employ methods of model-based predictive control (model predictive control, MPC for short) in the field of trajectory control. By reason of their flexibility and the explicit consideration of the future progression of the trajectory, MPC methods can achieve a high control performance. A particular strength of MPC methods is a direct consideration of the limitations of manipulated variables pertaining to an actuator. Accordingly, information about a tire/roadway contact—for instance, in the form of a maximum coefficient of friction—can be integrated into a prediction model of a model-based predictive control. The ascertainment of the tire/roadway contact—for example, in the form of a maximum coefficient of friction—can be undertaken by statistical methods, for instance. The integration of this information into the MPG control in the form of a friction-coefficient-dependent prediction model alone is able to guarantee a safe following of the predetermined trajectories by the vehicle only in exceptional cases. In particular, the safe implementation of the trajectory specification is not guaranteed when the system dynamics amount to a multiple of the length of the prediction horizon. By this it is meant, for example, that the vehicle cannot change its speed to an arbitrary value within the prediction horizon, but rather that the adaptation of the speed takes longer than the temporal length of the prediction horizon.

What is needed is making available a technology that that provides for a vehicle following, autonomously or semi-autonomously in particularly safe manner, a trajectory predetermined for it.

SUMMARY

The object is achieved by the subject-matters of the independent claims. Advantageous embodiments are the subject-matter of the subordinate claims, of the following description and also of the figures.

The present disclosure proposes to expand an MPG control by a safe range of states. For this purpose, additional auxiliary conditions can be introduced into the problem of optimization of the MPG control, for instance on the basis of stochastic information relating to the tire/roadway contact. These auxiliary conditions limit the range of the allowed system states—for example, the vehicle speed—so that the vehicle follows a predetermined trajectory with a specified safety. In particular, a determination of a safe range of states takes all the available trajectory information into consideration and not just the portion that lies within a prediction horizon. The disclosure makes it possible that the trajectory control guarantees, despite an uncertain specification of planning (for example, excessive speed), that the vehicle remains within the safe range of states.

In this regard, according to a first aspect of the disclosure a processor unit is proposed for ascertaining an input variable of an actuator of a vehicle by a model-based predictive control.

According to a second aspect of the disclosure, a system is proposed for ascertaining an input variable of an actuator of a vehicle by a model-based predictive control. In one exemplary arrangement, the system may include a sensor unit, the sensor unit having been set up to register an ambient state of a vehicle and/or a state of the vehicle and/or a running state of the vehicle, to generate, on the basis thereof, a state data record, and to transmit the data record to a processor unit. In one exemplary arrangement, the sensor unit may have been set up to register a quality of a tire/roadway contact by the sensor, and to generate, on the basis thereof, a friction-coefficient data record, and to transmit the friction coefficient data record to the processor unit.

According to aspect of the disclosure, a vehicle is proposed having a system according to the second aspect of the disclosure.

According to a fourth aspect of the disclosure, a method is proposed for ascertaining an input variable of an actuator of a vehicle by a model-based predictive control.

According to a fifth aspect of the disclosure, a computer-program product is proposed for ascertaining an input variable of an actuator of a vehicle by a model-based predictive control.

Particulars, optional features, technical effects, and also advantages and derivable solved technical problems, resulting therefrom, of the disclosure and of various exemplary arrangements will be described in further detail below, for the most part in connection with a processor unit. However, these statements also apply, with due alteration of details, to a system according to the second aspect of the disclosure, as well as to a vehicle and a method. A computer-program is also disclosed herein.

Accordingly, a processor unit may have been set up to ascertain an input variable of an actuator of a vehicle by model-based predictive control. In some exemplary arrangements, the processor unit has also been set up to control the actuator, and thereby the vehicle, by a model-based predictive control. The actuator may be, for instance, an actuator that influences or controls a steering system of the vehicle (steering actuator), a drive system of the vehicle (drive actuator), and in one exemplary arrangement, an internal-combustion engine or an electric motor of the vehicle, or a braking system of the vehicle (brake actuator). The disclosure and its exemplary arrangements will be predominantly described in connection with a single actuator. However, the statements also apply, with due alteration of details, to several actuators, in particular of different types. This means that the input variables of several—in particular, different—actuators of the vehicle can be ascertained with the subject-matters of the present disclosure. Moreover, the actuators can be acted upon in real time by the ascertained input variables, and consequently the vehicle can be controlled. The vehicle may, in particular, be controlled in such a manner that it moves autonomously (that is to say, without a driver of the vehicle intervening in the steering or control of the vehicle), but at least semi-autonomously.

The processor unit may include an interface. The processor unit may have been set up to access a state data record by the interface.

In one exemplary arrangement, the interface is, for example, a communications interface which enables the exchange of data. In one exemplary arrangement, the communications interface enables an exchange of data between the processor unit, on the one hand, and a sensor unit, on the other hand. Moreover, via the interface the processor unit is able to transmit commands to actuators of the vehicle, for instance to a steering actuator and/or to a brake actuator and/or to a drive actuator of the vehicle. In one exemplary arrangement, the processor unit has been set up to access, by the interface, a capture, generated by the sensor unit, of the surrounding field of the vehicle, and to apply an ascertained input variable to an actuator, or to order such an application, so that the vehicle follows a predetermined trajectory with a predetermined safety.

The state data record may, for instance, contain information about a current specific position of the vehicle. The state data record may represent an ambient state of the vehicle for example, whether and where other road users are located in the vicinity of the vehicle, the state of the roadway on which the vehicle is moving, or the sort of weather that is prevailing in the external environment of the vehicle. Alternatively or additionally, the state data record may represent a state of the vehicle—for example, a current position of the vehicle. Likewise alternatively or additionally, the state data record may represent a running state of the vehicle—for example, a current speed of the vehicle, a current yaw-rate of the vehicle, a current longitudinal acceleration and lateral acceleration of the vehicle, or a current sideslip angle of the vehicle.

Moreover, the processor unit may have been set up to access trajectory information or a predetermined trajectory for the vehicle by the interface. The predetermined trajectory can be generated by a trajectory algorithm or by a system for autonomous driving (autonomous driving system, AD system for short). The AD system typically comprises a module for perceiving the environment with sensors, and a planning module. The planning module may comprise several levels—for example, a navigation level on a relatively large scale (for example, several km; here a route can be chosen from start to destination) and a navigation level on a relatively small scale (for example, within the 50 m to 100 m situated ahead, depending upon the speed of the vehicle; here a choice of course and speed in the immediate vicinity of the vehicle is possible, in order to establish how the vehicle is to move in traffic). The planning module generates a trajectory which is specified to the MPC control and which can be accessed as input value by an auxiliary-condition algorithm described in further detail below.

The MPC algorithm comprises a model, by which a trajectory in the future is calculated on the basis of a calculated future input variable of an actuator. This calculated or predicted trajectory is compared with the predetermined trajectory and is optimized, by adaptation of a future input variable of the actuator, in such a manner that the predicted trajectory comes as close as possible to the predetermined trajectory.

The processor unit may have been set up to execute an auxiliary-condition algorithm, for calculating an auxiliary condition (first function block), and an MPC algorithm for model-based predictive control (second function block). For this purpose the processor unit may exhibit a single processor which executes both the algorithm for determining the auxiliary conditions and also the MPC algorithm. Alternatively, the processor unit may also comprise a first processor, which executes the algorithm for determining the auxiliary conditions, and a second processor which executes the MPC algorithm.

The MPC algorithm solves an optimization problem with auxiliary conditions. The auxiliary conditions are ascertained by the auxiliary-condition algorithm. In this regard, the processor unit may have been set up to ascertain an auxiliary condition for the MPC algorithm by executing the auxiliary-condition algorithm as a function of the trajectory information and as a function of the state data record. The auxiliary-condition algorithm draws upon the state data record as an input variable, in order to ascertain the auxiliary condition for the MPC algorithm in such a manner that the MPC control is in a safe state or in an implementable state.

The processor unit may furthermore have been set up to ascertain an input variable for an actuator of the vehicle by executing the MPC algorithm as a function of the auxiliary condition, so that in a future predicted trajectory the vehicle follows the predetermined trajectory with a predetermined safety. Moreover, the auxiliary condition can, in particular, also be ascertained as a function of the predetermined trajectory and as a function of the predicted trajectory. The auxiliary condition—for example, a speed restriction—does not necessarily have to be set particularly conservatively—that is to say, with a very high degree of safety—since it is still possible for the MPC algorithm to reduce the speed (within physical limits) even within its typically limited temporal prediction horizon in order to keep the vehicle within a safe range of states in the event of a changed state.

In other words, the auxiliary conditions are taken into consideration in the MPC algorithm as boundary conditions of the optimization problem. The auxiliary conditions can be chosen in such a way that they correspond to vehicle states outside of what is physically possible along the trajectories. The auxiliary conditions are chosen, in particular, in such a manner that within its prediction horizon the MPC algorithm is able to take the vehicle to physically realizable states. By virtue of the proposed structure consisting of separate auxiliary-condition algorithm and MPC algorithm, the auxiliary-condition algorithm is able to utilize the full length of the trajectory information, whereas the prediction horizon of the MPC algorithm can be chosen to be shorter. The trajectory information as an input in the auxiliary-condition algorithm and MPC algorithm does not have to lie within the physically possible vehicle states. This would inevitably lead to conservative trajectory planning, since the precise estimation of the physically possible vehicle states is not possible.

In one exemplary arrangement, the state data record comprises a friction-coefficient data record that represents a quality of a tire/roadway contact. By the "quality of a tire/roadway contact", the following may be understood: the vehicle includes several wheels, each with one tire. Each of these tires is in contact with a roadway, in particular a road, on which the vehicle is traveling or, to be more precise, on which the tires are rolling. The tires are consequently in contact with the roadway. The quality of this contact may, in particular, be indicated by a coefficient of friction between the tires and the roadway. A higher coefficient of friction corresponds to a higher quality of the tire/roadway contact, and a lower coefficient of friction corresponds to a lower quality of the tire/roadway contact.

In one exemplary arrangement, the processor unit has been set up to receive the friction-coefficient data record from a sensor unit by the interface, in which connection the sensor unit registers the quality of the tire/roadway contact by a sensor. In an alternative arrangement, the processor unit has been set up to ascertain the friction-coefficient data record statistically, in particular stochastically. In another exemplary arrangement, the processor unit is able to receive the coefficient of friction from other vehicles, infrastructure facilities or servers, for instance via a car-to-car network or via a car-to-X network.

The vehicle can be controlled on the basis of the results of the auxiliary-condition algorithm and of the MPC algorithm. In this regard, in one exemplary arrangement there is a provision that the actuator is caused—in particular, by the processor unit—to be acted upon by the ascertained input variable. For instance, the vehicle may include a control device which has been assigned to the actuator. The control device can apply the input variable to the actuator. The processor unit, in turn, can control the control device. Consequently it is possible to intervene actively and physically in the control of the vehicle, so that the vehicle is not merely located within the predicted model but is also really located within a safe range of states. First of all, an optimal input variable for the actuator is ascertained by the processor unit. Subsequently an implementation of the input variable takes place in the actuator, the output variable of which changes or manipulates the motion of the vehicle. The vehicle then ideally follows the predetermined trajectory with the predetermined safety.

A temporal prediction horizon can be chosen in the MPC algorithm to be relatively short, in order to be able to keep the computation effort so low that a real-time control is possible. By incorporating the auxiliary condition that is ascertained by the auxiliary-condition algorithm, the MPC algorithm can compensate for its relatively short temporal prediction horizon. Without the auxiliary condition, under certain circumstances the MPC control alone does not control looking far enough ahead, in order, for instance, to reduce a relatively high speed sufficiently by reason of a change of state arising in future outside the prediction horizon—for example, if a particularly slippery route segment on a curve has to be negotiated.

The calculation of the auxiliary conditions for the safe range of states may be undertaken independently of a prediction horizon of the MPC algorithm and may incorporate all the trajectory information. As a result, the auxiliary condition for the safe range of states can limit the speed of the vehicle to a maximum speed that enables a deceleration to a safe speed within the prediction horizon. In particular, the determination of the safe range of states consequently takes all the available trajectory information into consideration and not just the portion that lies within the prediction horizon. In this regard, according to a further embodiment there is provision that the processor unit has been set up to ascertain the auxiliary condition as a function of the entire predetermined trajectory by executing the auxiliary-condition algorithm. In other words, the ascertainment of the auxiliary condition by executing the auxiliary-condition algorithm has not been restricted by a prediction horizon that has been established for the MPC algorithm.

BRIEF DESCRIPTION OF DRAWINGS

Exemplary arrangements of the disclosure will be elucidated in more detail in the following detailed description with reference to the drawings which are schematic and not true to scale, wherein like or similar elements have been provided with the same reference symbol. Shown in the drawings are.

DETAILED DESCRIPTION

Figure 1:
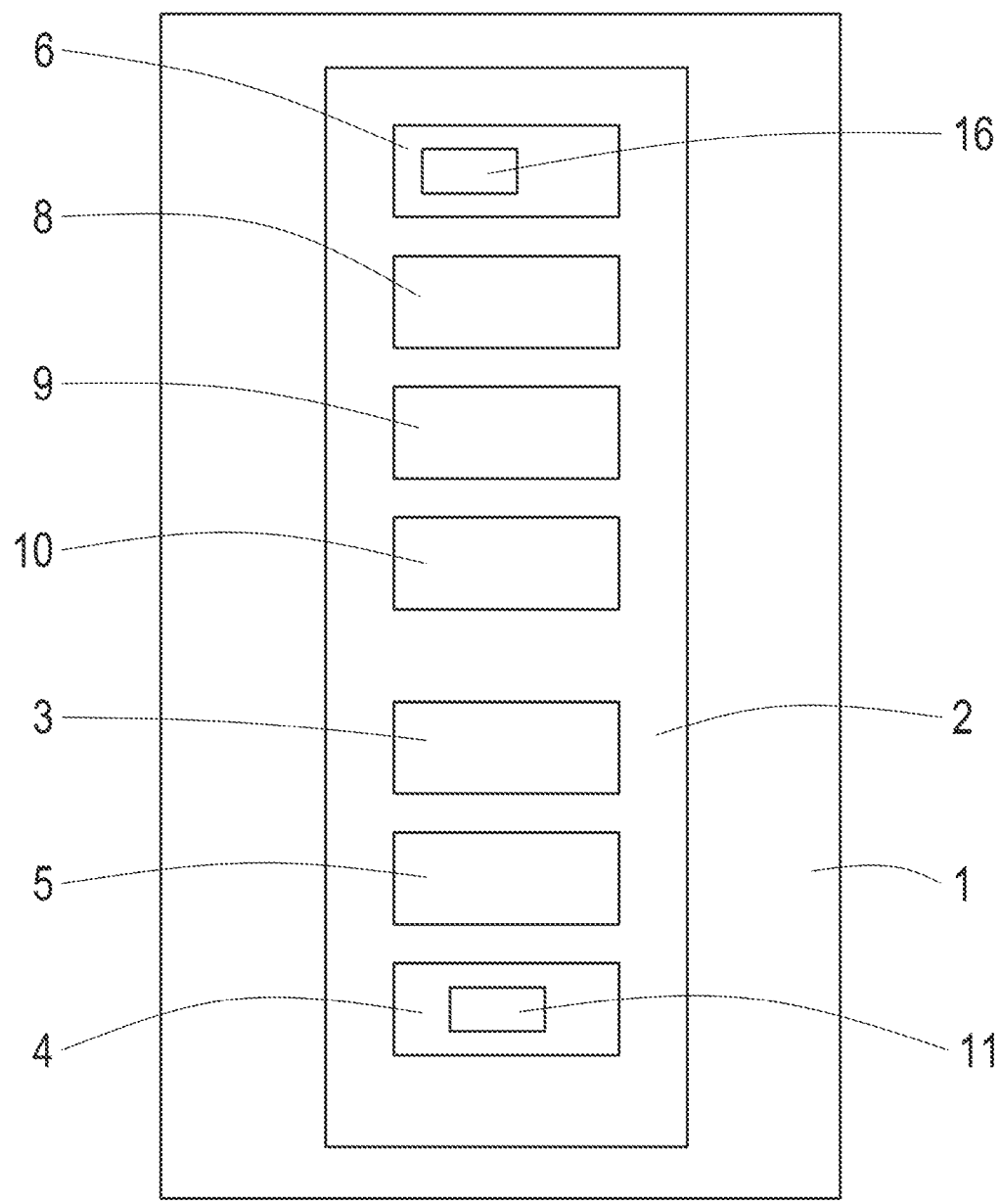
FIG. 1 a plan view of a vehicle with a system for controlling a vehicle by model-based predictive control.

FIG. 1 shows a vehicle 1. The vehicle 1 includes a system 2 for ascertaining an input variable of a vehicle actuator and for controlling a vehicle by model-based predictive control. In the exemplary arrangement shown, the system 2 comprises a processor unit 3, a memory unit 4, a communications interface 5 and a sensor unit 6. In the exemplary arrangement shown, the sensor unit 6 includes a digital camera system which is designated in the following by "camera". The camera may be arranged on the vehicle in such a manner that a field of view of the camera can capture an external surrounding field of the vehicle and optionally a roadway 7 (FIG. 2) on which the vehicle 1 is moving. The sensor unit 6 may include a number of further sensors 16 which, for instance, have been set up to ascertain the position of the vehicle, the speed, yaw-rate or lateral acceleration thereof, and to provide these measurements to the processor unit 3. The processor unit 3 can access this information in the form of a state data record 17, for instance via the communications interface 5.

The camera records images successively and continuously—for example, also of the roadway 7—as a result of which a video or an image sequence also of the roadway 7 is generated. Within the individual images of this video or of this image sequence, image details can be defined (regions of interest, ROI for short), within which a current coefficient of friction, for example, between the tires of the vehicle 1 and the road 7 can be detected by methods of image recognition.

Alternatively, the current coefficient of friction between the tires of the vehicle 1 and the roadway 7 can also be ascertained by stochastic methods or can be transmitted to the vehicle 1 from another vehicle, from a traffic-infrastructure device or from a traffic server, so that the processor unit 3 can likewise access it in the form of the state data record.

Moreover, the vehicle 1 includes several actuators. A first actuator 8, a second actuator 9 and a third actuator 10 are represented by way of example in FIG. 1. The first actuator 8 can control the steering of the vehicle 1 (steering actuator 8). The second actuator 9 can control the drive of the vehicle 1 (drive actuator 9). The third actuator 10 can control the brakes of the vehicle 1 (brake actuator 10).

A computer-program 11 may be stored in the memory unit 4. The computer-program 11 can be executed in the processor unit 3, for which purpose the processor unit 3 and the memory unit 4 have been connected to one another by the communications interface 5. When the computer-program product 11 is executed in the processor unit 3, it instructs the processor unit 3 to perform the functions described in connection with the drawing or, to be more precise, to execute steps of the method.

Figure 2:
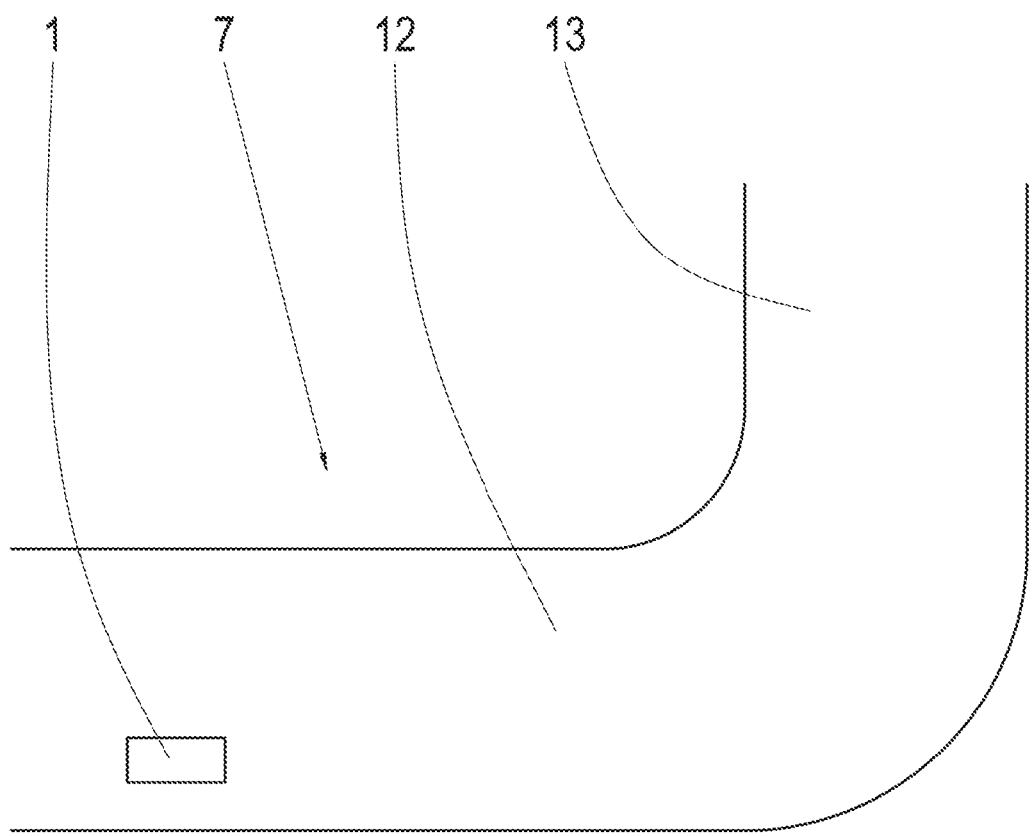
FIG. 2 a plan view of a roadway on which the vehicle according to FIG. 1 is traveling autonomously or semi-autonomously, and FIG. 3 modules for ascertaining an input variable of an actuator of the vehicle according to FIG. 1.

FIG. 2 shows the vehicle 1 on the roadway 7 of a road. In the example shown in FIG. 2, the vehicle 1 is traveling on the roadway 7 at a speed of 20 m/s. The roadway 7 has a first route segment 12 and a second route segment 13 which directly adjoins the first route segment 12. The first route segment 12 runs straight and is 50 m long. The second route segment 13 is a left-hand curve.

Figure 3:
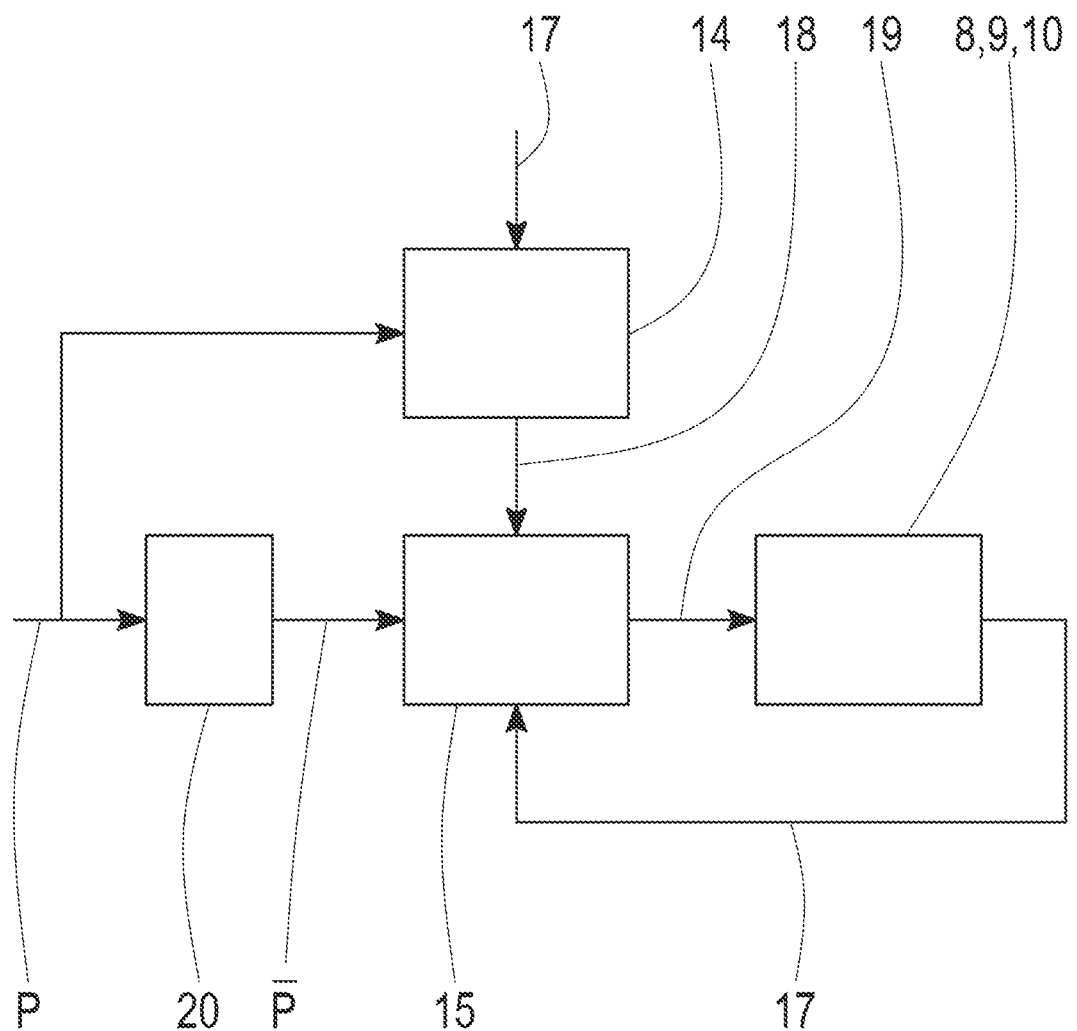

FIG. 3 shows schematically individual components and algorithms of the computer-program 11 for ascertaining an input variable 19 of at least one of the vehicle actuators 8, 9 and 10 by model-based predictive control. The computer-program 11 includes an auxiliary-condition algorithm 14 (feasible-states estimator), for calculating an auxiliary condition 18, and an MPC algorithm 15 for calculating an input variable 19, for instance for the brake actuator 10 of the vehicle 1. Moreover, the computer-program 11 includes a trajectory algorithm 20 for calculating an MPC reference trajectory $\overline{P}$ from trajectory information P.

The interface 5 of the processor unit 3 accesses the state data record 17 which contains, for instance, information about the current position and speed of the vehicle 1 and also about the coefficient of friction of the roadway 7 on the curve 13. Moreover, the interface 5 of the processor unit 3 accesses trajectory information P and a trajectory $\overline{P}$, calculated by the trajectory algorithm, for the vehicle 1. In the example according to FIG. 2, the trajectory information P, which is supplied to the auxiliary-condition algorithm 14, implies that the designated course of the journey is firstly undertaken on the straight route segment 12 straight ahead for 50 m and then curved to the left in accordance with the progression of the curve 13. The trajectory $\overline{P}$ calculated by the trajectory algorithm is shorter than the trajectory information P and consequently contains only a fraction of the trajectory information P.

If the prediction horizon of the MPC algorithm 15 amounts to 1 s, for instance, an MPC control without auxiliary conditions for a safe range of states can only react to the approaching left-hand curve 13 if the latter lies within the prediction horizon. However, depending upon the current tire/roadway contact, this may already be too late in order to reduce the speed of the vehicle 1 to such an extent that a safe negotiating of the curve 13 is possible. With a view to solving this problem, the processor unit 3 executes the auxiliary-condition algorithm 14 and thereby ascertains at least one auxiliary condition 18 for the MPC algorithm 15 as a function of the state data record 17 and as a function of the trajectory information P. By virtue of the auxiliary-condition algorithm 14, auxiliary conditions 18 can be calculated that constitute an outer boundary of the state space that can be realized by the vehicle 1 on the trajectory $\overline{P}$. The at least one auxiliary condition 18 for the MPC algorithm 15 is ascertained in such a manner that the MPC control is in a safe state or in an implementable state. Consequently a safe or possible auxiliary condition 18 of the state for the MPC control is ascertained. In other words, the at least one auxiliary condition 18 delimits a safe state space that can be provided to the MK algorithm 15 as auxiliary condition for the predetermined trajectory P.

The MPC algorithm 15 comprises a model, by which a trajectory of the vehicle 1 in the future is calculated on the basis of a calculated future input variable of at least one actuator 8, 9, 10. This calculated or predicted trajectory is compared with the predetermined trajectory $\overline{P}$ and is optimized, by adaptation of a future manipulated variable or input variable 19 of the actuator 8, 9 and/or 10 in question (for example, steering angle, braking torque, drive torque, etc.), in such a manner that the predicted trajectory comes as close as possible to the predetermined trajectory.

The processor unit 3 executes the MPC algorithm 15 and thereby ascertains an input variable 19, for instance for the brake actuator 10 of the vehicle 1, as a function of the auxiliary condition 18, so that in a future predicted trajectory the vehicle 1 follows the predetermined trajectory with a predetermined safety. The processor unit 3 furthermore instructs the actuator 10 to perform an adjustment corresponding to the input variable 19. If, for instance, the state data record 17 contains the information that it will be very slippery on the curve 13, the auxiliary condition 18 can then be ascertained by the auxiliary-condition algorithm 14 in such a manner that the input variable 19, ascertained by execution of the MPC algorithm 15, for the brake actuator 10 provides for braking the vehicle 1 sufficiently in order to guarantee a safe passage through the curve 13 and to prevent the vehicle 1 from entering the region of the curve at too high a speed.

The invention claimed is:

1. A processor unit for ascertaining an input variable of a vehicle actuator by model-based predictive control ("MPC"), the processor unit including an interface, the processor unit having been set up to:
   access, by the interface, trajectory information and a state data record that represents an ambient state of the vehicle and/or a state of the vehicle and/or a running state of the vehicle,
   execute an auxiliary-condition algorithm for calculating an auxiliary condition,
   execute an MPC algorithm for model-based predictive control, wherein the MPC algorithm comprises a model, by which a future predicted trajectory is calculated,
   ascertain the auxiliary condition for the MPC algorithm by executing the auxiliary-condition algorithm as a function of the trajectory information and as a function of the state data record, wherein the auxiliary condition is calculated that constitutes an outer boundary of a state space that can be realized by the vehicle on the future predicted trajectory;
   ascertain an input variable for an actuator of the vehicle by executing the MPC algorithm as a function of the auxiliary condition, so that in the future predicted trajectory, the vehicle follows a predetermined trajectory that may be accomplished, wherein the auxiliary condition is calculated independent of a prediction horizon of the MPC algorithm.

2. The processor unit as claimed in claim 1, wherein the state data record comprises a friction-coefficient data record that represents a quality of a tire/roadway contact.

3. The processor unit as claimed in claim 2, the processor unit having been set up to receive the friction-coefficient data record from a sensor unit, in which connection to the sensor unit registers the quality of the tire/roadway contact.

4. The processor unit as claimed in claim 2, the processor unit having been set up to ascertain the friction-coefficient data record statistically.

5. The processor unit as claimed in claim 4, the processor unit having been set up to ascertain the friction-coefficient data record stochastically.

6. The processor unit as claimed in claim 1, wherein the processor unit is set up to cause the actuator to be acted upon by the ascertained input variable.

7. The processor unit as claimed in claim 1, wherein the processor unit is set up to ascertain the auxiliary condition as a function of an entirety of the predetermined trajectory by executing the auxiliary-condition algorithm.

8. A system for ascertaining the input variable of a vehicle actuator by model-based predictive control, the system including the processor unit as claimed in claim 1.

9. The system as claimed in claim 8, the system further including a sensor unit, the sensor unit being set up to register the ambient state of the vehicle-to generate, on the basis thereof, the state data record, and to transmit said data record to the processor unit.

10. The system as claimed in claim 9, the sensor unit registering a quality of the tire/roadway contact by a sensor to generate, on the basis thereof, a friction-coefficient data record, and to transmit the friction-coefficient data record to the processor unit.

11. The system as claimed in claim 8, the system further including a sensor unit, the sensor unit being set up to register the state of the vehicle to generate, on the basis thereof, the state data record, and to transmit said data record to the processor unit.

12. The system as claimed in claim 8, the system further including a sensor unit, the sensor unit being set up to register the running state of the vehicle to generate, on the basis thereof, the state data record, and to transmit said data record to the processor unit.

13. A method for ascertaining an input variable of a vehicle actuator using model-based predictive control ("MPC"), the method comprising:

accessing trajectory information and a state data record by an interface of a processor unit, the state data record representing one of an ambient state of the vehicle and a state of the vehicle and a running state of the vehicle, executing an auxiliary-condition algorithm for calculating an auxiliary condition by the processor unit, executing an MPC algorithm for model-based predictive control by the processor unit, wherein the MPC algorithm comprises a model by which a future predicted trajectory is calculated, ascertaining an auxiliary condition for the MPC algorithm by executing the auxiliary-condition algorithm as a function of the trajectory information and as a function of the state data record, wherein the auxiliary condition is calculated that constitutes an outer boundary of a state space that can be realized by the vehicle on the future predicted trajectory; and ascertaining an input variable for an actuator of the vehicle by executing the MPC algorithm as a function of the auxiliary condition, so that in the future predicted trajectory the vehicle follows a predetermined trajectory that may be realized, wherein the auxiliary condition is calculated independent of a prediction horizon of the MPC algorithm.

14. The method of claim 13, wherein the processor instructs the actuator to perform an adjustment corresponding to the input variable.

* * * * *